United States Patent
Benford, Jr. et al.

(10) Patent No.: US 9,072,400 B2
(45) Date of Patent: *Jul. 7, 2015

(54) DARK COLORED EASY-TO-CLEAN ENAMEL

(71) Applicant: Ferro Corporation, Mayfield Heights, OH (US)

(72) Inventors: Albert L. Benford, Jr., Bedford Heights, OH (US); Andrew Gorecki, Brunswick, OH (US); Louis J. Gazo, Independence, OH (US); Charles A. Baldwin, Brooklyn, OH (US)

(73) Assignee: Ferro Corporation, Mayfield Heights, OH (US)

( * ) Notice: Subject to any disclaimer, the term of this patent is extended or adjusted under 35 U.S.C. 154(b) by 302 days.

This patent is subject to a terminal disclaimer.

(21) Appl. No.: 13/661,174

(22) Filed: Oct. 26, 2012

(65) Prior Publication Data

US 2013/0045389 A1 Feb. 21, 2013

Related U.S. Application Data

(63) Continuation-in-part of application No. 12/768,213, filed on Apr. 27, 2010, now Pat. No. 8,778,455.

(51) Int. Cl.

| B32B 15/04 | (2006.01) |
|---|---|
| B32B 17/06 | (2006.01) |
| A47J 36/02 | (2006.01) |
| C03C 3/066 | (2006.01) |
| C03C 3/118 | (2006.01) |
| C03C 8/06 | (2006.01) |
| C03C 8/14 | (2006.01) |
| C23D 5/02 | (2006.01) |

(52) U.S. Cl.
CPC ............. *A47J 36/025* (2013.01); *C03C 3/066* (2013.01); *C03C 3/118* (2013.01); *C03C 8/06* (2013.01); *C03C 8/14* (2013.01); *C23D 5/02* (2013.01)

(58) Field of Classification Search
USPC ......... 428/426, 428, 432, 688, 689, 697, 699, 428/701, 702, 433, 704; 501/24, 73
See application file for complete search history.

(56) References Cited

U.S. PATENT DOCUMENTS

| 4,110,487 | A | * | 8/1978 | Rion .............................. 427/470 |
|---|---|---|---|---|
| 6,001,494 | A | * | 12/1999 | Kuchinski et al. ............ 428/653 |
| 6,251,810 | B1 | | 6/2001 | Siebers et al. |
| 6,429,161 | B1 | | 8/2002 | Souchard et al. |
| 6,475,939 | B1 | * | 11/2002 | Souchard et al. ............... 501/14 |
| 6,511,931 | B1 | | 1/2003 | Baldwin |
| 6,896,934 | B2 | * | 5/2005 | Aronica et al. ................ 427/475 |
| 7,005,396 | B2 | | 2/2006 | Espargilliere et al. |
| 7,244,502 | B2 | | 7/2007 | Aronica et al. |
| 2002/0061809 | A1 | * | 5/2002 | Aronica et al. .................. 501/24 |
| 2005/0014625 | A1 | * | 1/2005 | Espargilliere et al. .......... 501/48 |
| 2005/0148722 | A1 | * | 7/2005 | Aronica et al. ................ 524/494 |
| 2009/0311514 | A1 | * | 12/2009 | Shon et al. ..................... 428/325 |
| 2013/0045389 | A1 | * | 2/2013 | Benford et al. ............... 428/433 |

FOREIGN PATENT DOCUMENTS

| EP | 1167310 A1 | 1/2002 |
|---|---|---|
| WO | 0202471 A1 | 1/2002 |
| WO | 03008354 A1 | 1/2003 |

OTHER PUBLICATIONS

International Search Report, International Application No. PCT/US2011/033895 filed Apr. 28, 2011, 3 pages.
International Preliminary Report on Patentability, International Application No. PCT/US2011/033895 filed Apr. 28, 2011, 15 pages.

* cited by examiner

*Primary Examiner* — David Sample
*Assistant Examiner* — Lauren Colgan
(74) *Attorney, Agent, or Firm* — Rankin, Hill & Clark LLP

(57) ABSTRACT

A composition that upon firing, forms a low-temperature clean enamel layer is disclosed. The composition can be applied to a metal substrate to provide a low-temperature cleaning, durable coating for cooking surfaces. Also disclosed are methods of forming enamel layers and corresponding coated substrates. Various ground coats and related methods are also described. Furthermore, various multilayer coatings and structures are disclosed that include an enamel layer and a ground coat layer.

13 Claims, No Drawings

DARK COLORED EASY-TO-CLEAN ENAMEL

STATEMENT OF RELATED APPLICATIONS

This application is a continuation-in-part of U.S. application Ser. No. 12/768,213 filed 27 Apr. 2010, which is incorporated by reference herein for all purposes.

FIELD OF THE INVENTION

The present invention provides enamel compositions and ground coat compositions. More particularly, the present invention provides compositions for use in forming an acid resistant and chip resistant enamel cover coating from which baked-on foods can be removed without the need for pyrolysis or highly alkaline cleaners. Also provided are methods for forming the enamel coating, enamel coated substrates, ground coat, and multilayer coated substrates.

BACKGROUND OF THE INVENTION

An oven can be one of the most difficult kitchen appliances to clean. Food that splatters onto the interior surfaces of an oven during cooking usually becomes baked-on, making the removal thereof particularly difficult. If the oven is not frequently cleaned, the amount of baked-on food can build up rapidly, thereby increasing the cleaning difficulty.

Coatings used for the interiors of ovens are primarily one of three types: (1) self-cleaning pyrolytic ground coats, (2) non-self-cleaning ground coats, and (3) catalytic continuous clean enamels.

The first type of coatings, i.e. self-cleaning pyrolytic ground coats, enable food residue to be reduced to ash by exposure to temperatures between about 850 and 1000° F. (455 and 538° C.). However, there are several concerns associated with heating oven coatings to such temperatures. First, high temperatures are required, necessitating extra insulation around the oven chamber and safety interlocks for oven operation. Second, producing such high temperatures requires relatively large amounts of energy consumption. Third, depending upon the materials exposed to such high temperatures, concerns exist as to the possible release of toxic fumes. Fourth, the cleaning cycle used in association with these coatings takes up to three hours to complete and potentially reduces the overall service life of the oven. Further, in order to withstand multiple cleaning cycles, such enamel coatings generally contain hard, chemically-resistant frits that, without high-temperature exposure, have inherently poor release properties, thereby compounding the difficulty in removing baked-on residues.

The second type of coating, i.e. non-self-cleaning ground coats, requires significant cleaning efforts by the consumer and/or harsh alkaline saponifying cleaners that have a pH of approximately 14. As will be appreciated, significant safety concerns exist when using, handing, and storing such hazardous and often toxic cleaners. In addition, producing various oven models each with potentially different interior coatings can increase manufacturing complexity and thus costs. In order to provide a lower cost appliance, Original Equipment Manufacturers (OEMs) generally use the same pyrolytic enamel as used in self-cleaning ovens, but do not equip the oven with a self-clean cycle. Thus, although satisfactory, many ovens such as those lacking a self-cleaning cycle, utilize coatings that are not optimally designed for the oven.

The third type of coating, i.e. catalytic continuous clean enamels, fire out with a porous microstructure, enabling the reduction of food residue to ash at normal cooking temperatures. Although satisfactory in many regards, these coatings have largely fallen out of use in North America but are still in use in other markets.

The patent literature has described enamel cover coatings. U.S. Pat. No. 7,005,396 describes enamel formulas that include mixtures of low softening point alkali aluminophosphate frit with a high softening point zirconia phosphate frit. The soft frit fluxes the hard frit, creating workability within typical oven enamel firing conditions of 1520 to 1600° F. (827 to 871° C.). The fired coating sheds baked-on foodstuffs upon exposure to a moist environment. The soil release mechanism is hypothesized to be due to relatively weakly bonded surface absorbed water rather than the significantly stronger bonds otherwise occurring on conventional enamels. When applied to an oven cavity, this surface creates a fourth option for soil removal through relatively brief exposure to water or steam at much lower temperatures than used with the pyrolytic enamels and without the use of harsh alkaline cleaners.

However, the glasses discussed in U.S. Pat. No. 7,005,396 have certain characteristics that preclude their use in oven applications using ground coats or that render them difficult to apply with dry electrostatic methods to oven surfaces. The thermal expansion of the glasses is too high relative to ground coats typically used in ovens. This difference in thermal expansion characteristics would lead to cracking or other distortions in an oven coating using such glasses. In addition, the glass temperature of the glasses is below 750° F. (400° C.). On hidden bake ovens in which an oven floor covers the heating element, the floor can exceed these temperatures. Foods baked-on above the glass temperature would then not necessarily release upon exposure to moisture. As for their application characteristics, a soft and hard frit with mill-added raw materials described in that patent would tend to segregate on recirculation through an automatic spray booth and thus this characteristic detracts from application of the glass mixture via spraying.

Accordingly, there exists a need for a composition that can be applied to the interior surfaces of oven cavities and other articles from which baked-on foods can be easily removed without the need for pyrolysis or highly alkaline cleaners.

SUMMARY OF THE INVENTION

The difficulties and drawbacks associated with previously known systems are addressed in the present compositions, methods, and coated substrates involving enamel cover coatings and ground coats that enable baked-on foods to be easily removed.

The compositions of the invention may be produced in a wide range of colors, however charred food soils will stain lighter colored coating. To reduce the appearance of stains, the color of the porcelain enamel should be relatively dark. The Hunter L color value should be below 30, preferably below 25, more preferably below 20 and still more preferably below 15.

The inventors have discovered that, while nickel can be effectively used to adjust color, the removal of nickel eliminates problems of metalizing around the edges of a substrate coated with the enamel composition of the invention.

Mixed metal oxides such as cobalt oxide, chrome oxide, copper oxide and manganese oxide are added to the enamels of the invention without the use of nickel oxide to achieve the desired color, neutral grey, with Hunter L<30. Cobalt and chrome produce a darker yet more neutral color. In particular, the enamel compositions of the invention include less than 2 wt % Ni, preferably less than 1.5% Ni, more preferably less than 1 wt % Ni, still more preferably less than 0.5 wt % Ni, even more preferably less than 0.25 wt % Ni and still more preferably less than 0.1 wt % Ni. Most preferably, the compositions of the invention are nickel free.

An embodiment of the invention is a process for obtaining a fired coating having a Hunter L color value less than 30 comprising: (a) applying to a substrate a composition comprising: (i) a glass component including: from about 7% to about 25% of at least one $R_2O$; from about 0% to about 15% of at least one RO; from about 5% to about 20% of at least one $MO_2$; from about 8% to about 25% of $Al_2O_3$; from about 3% to about 25% of $SiO_2$; from about 15% to about 40% of $P_2O_5$; and (ii) an effective amount of an additive; wherein $R_2O$ is an alkali oxide, RO is an alkaline earth oxide, and MO, $MO_2$ and $M_2O_3$ are transition metal oxides.

Generally, the present invention provides a composition adapted for forming an enamel coating. The composition prior to firing, comprises: (i) a glass component including from about 10.0% to about 20.0% of at least one $R_2O$, from about 2.7% to about 3.3% of at least one RO, from about 0.6% to about 2.8% of at least one MO, from about 15.1% to about 17.6% of at least one $MO_2$, from about 0.1% to about 6.3% of at least one $M_2O_3$, from about 19.3% to about 20.7% of $Al_2O_3$, from about 10.8% to about 11.8% of $SiO_2$, and from about 29.2% to about 31.3% of $P_2O_5$, and (ii) an effective amount of an additive. $R_2O$ is an alkali oxide, RO is an alkaline earth oxide, and MO, $MO_2$ and $M_2O_3$ are transition metal oxides. Also provided are methods of forming enamel coatings on substrates by use of these compositions. And, the present invention additionally provides various enamel coated substrates.

More specifically, and in one aspect, the present invention provides a composition adapted for forming an enamel coating. The composition prior to firing, comprises (i) a glass component that includes from about 7.1% to about 7.9% $Na_2O$, from about 7.0% to about 7.7% $K_2O$, from about 0.6% to about 1.0% ZnO, from about 2.7% to about 3.3% BaO, from about 19.3% to about 20.7% $Al_2O_3$, from about 10.8% to about 11.8% $SiO_2$, from about 0.7% to about 1.2% $TiO_2$, from about 14.4% to about 15.6% $ZrO_2$, from about 29.2% to about 31.3% $P_2O_5$, and from about 0.1% to about 5.2% $Co_2O_3$, and (ii) an effective amount of at least one additive selected from the group consisting of fluorine and $NO_2$.

Specifically and in another aspect, the present invention provides a method for forming an enamel coating on a substrate. The method comprises providing a substrate for receiving the coating. The method also comprises providing a composition that includes (i) a glass component and (ii) an effective amount of at least one additive selected from the group consisting of fluorine and $NO_2$. The glass component includes from about 7.1% to about 7.9% $Na_2O$, from about 7.0% to about 7.7% $K_2O$, from about 0.6% to about 1.0% ZnO, from about 2.7% to about 3.3% BaO, from about 19.3% to about 20.7% $Al_2O_3$, from about 10.8% to about 11.8% $SiO_2$, from about 0.7% to about 1.2% $TiO_2$, from about 14.4% to about 15.6% $ZrO_2$, from about 29.20% to about 31.3% $P_2O_5$, and from about 0.1% to about 5.2% $Co_2O_3$. The method also comprises depositing a layer of the composition on the substrate. And, the method additionally comprises firing the layer to thereby form an enamel coating on the substrate.

Specifically and in yet another aspect, the present invention provides an enamel coated substrate. The enamel coating has a composition prior to firing that comprises (i) a glass component and (ii) an effective amount of at least one additive selected from the group consisting of fluorine and $NO_2$. The glass component includes from about 7.1% to about 7.9% $Na_2O$, from about 7.0% to about 7.7% $K_2O$, from about 0.6% to about 1.0% ZnO, from about 2.7% to about 3.3% BaO, from about 19.3% to about 20.7% $Al_2O_3$, from about 10.8% to about 11.8% $SiO_2$, from about 0.7% to about 1.2% $TiO_2$, from about 14.4% to about 15.6% $ZrO_2$, from about 29.2% to about 31.3% $P_2O_5$, and from about 0.1% to about 5.2% $Co_2O_3$.

Generally, the present invention also provides a composition adapted for forming a ground coat. The composition prior to firing, comprises: from about 14.4% to about 18.4% of at least one $R_2O$, from about 8.5% to about 11.7% of at least one RO, from about 2.5% to about 5.3% of at least one MO, from about 4.0% to about 9.2% of at least one $MO_2$, from about 0.4% to about 1.4% of at least one $M_2O_3$, from about 16.0% to about 17.2% of $B_2O_3$, from about 2.0% to about 5.0% of $Al_2O_3$, from about 41.8% to about 46.2% of $SiO_2$, and an effective amount of at least one additive. In addition, the present invention provides various methods of forming ground coats by use of these compositions, and the resulting ground coated substrates.

More specifically and in still a further aspect, the present invention provides a composition adapted for forming a ground coat. The composition prior to firing, comprises from about 2.5% to about 3.6% $Li_2O$, from about 11.0% to about 12.7% $Na_2O$, from about 0.9% to about 2.1% $K_2O$, from about 5.4% to about 6.8% CaO, from about 3.1% to about 4.9% BaO, from about 16.0% to about 17.2% $B_2O_3$, from about 2.0% to about 5.0% $Al_2O_3$, from about 41.8% to about 46.2% $SiO_2$, from about 0% to about 1.6% $TiO_2$, from about 3.0% to about 6.3% $ZrO_2$, from about 2.2% to about 3.2% NiO, from about 0.3% to about 1.2% CuO, from about 0.05% to about 0.9% $Fe_2O_3$, from about 0.4% to about 1.4% $Co_2O_3$, and from about 1.0% to about 1.3% $MnO_2$. The composition also comprises an effective amount of at least one additive selected from the group consisting of fluorine and $NO_2$.

Specifically and in another aspect, the present invention provides a method of forming a ground coat on a substrate. The method comprises providing a substrate, and providing a composition comprising (i) an effective amount of at least one additive selected from the group consisting of fluorine and $NO_2$, and (ii) a ground coat formulation. The ground coat formulation includes from about 2.5% to about 3.6% $Li_2O$, from about 11.0% to about 12.7% $Na_2O$, from about 0.9% to about 2.1% $K_2O$, from about 5.4% to about 6.8% CaO, from about 3.1% to about 4.9% BaO, from about 16.0% to about 17.2% $B_2O_3$, from about 2.0% to about 5.0% $Al_2O_3$, from about 41.8% to about 46.2% $SiO_2$, from about 0% to about 1.6% $TiO_2$, from about 3.0% to about 6.3% $ZrO_2$, from about 2.2% to about 3.2% NiO, from about 0.3% to about 1.2% CuO, from about 0.05% to about 0.9% $Fe_2O_3$, from about 0.4% to about 1.4% $Co_2O_3$, and from about 1.0% to about 1.3% $MnO_2$. The method comprises depositing a layer of the composition on the substrate, and firing the layer to thereby form a ground coat on the substrate.

Specifically and in still another aspect, the present invention provides a ground coated substrate. The ground coat has a composition prior to firing that comprises from about 2.5% to about 3.6% $Li_2O$, from about 11.0% to about 12.7% $Na_2O$, from about 0.9% to about 2.1% $K_2O$, from about 5.4% to about 6.8% CaO, from about 3.1% to about 4.9% BaO, from about 16.0% to about 17.2% $B_2O_3$, from about 2.0% to about 5.0% $Al_2O_3$, from about 41.8% to about 46.2% $SiO_2$, from about 0% to about 1.6% $TiO_2$, from about 3.0% to about 6.3% $ZrO_2$, from about 2.2% to about 3.2% NiO, from about 0.3% to about 1.2% CuO, from about 0.05% to about 0.9% $Fe_2O_3$, from about 0.4% to about 1.4% $Co_2O_3$, from about 1.0% to about 1.3% $MnO_2$, and an effective amount of at least one additive selected from the group consisting of fluorine and $NO_2$.

Specifically and in yet another aspect, the present invention also provides a coated substrate including a ground coat disposed on the substrate and an enamel coating disposed on the ground coat. The ground coat has a composition prior to firing that comprises from about 2.5% to about 3.6% $Li_2O$, from about 11.0% to about 12.7% $Na_2O$, from about 0.9% to about 2.1% $K_2O$, from about 5.4% to about 6.8% CaO, from about 3.1% to about 4.9% BaO, from about 16.0% to about 17.2% $B_2O_3$, from about 2.0% to about 5.0% $Al_2O_3$, from about 41.8% to about 46.2% $SiO_2$, from about 0% to about 1.6% $TiO_2$, from about 3.0% to about 6.3% $ZrO_2$, from about 2.2% to about 3.2% NiO, from about 0.3% to about 1.2% CuO, from about 0.05% to about 0.9% $Fe_2O_3$, from about 0.4% to about 1.4% $Co_2O_3$, from about 1.0% to about 1.3% $MnO_2$, and an effective amount of at least one additive selected from the group consisting of fluorine and $NO_2$. The enamel coating has a composition prior to firing that comprises (i) a glass component and (ii) an effective amount of at least one additive selected from the group consisting of fluorine and $NO_2$, wherein the glass component includes: from about 7.1% to about 7.9% $Na_2O$, from about 7.0% to about 7.7% $K_2O$, from about 0.6% to about 1.0% ZnO, from about 2.7% to about 3.3% BaO, from about 19.3% to about 20.7% $Al_2O_3$, from about 10.8% to about 11.8% $SiO_2$, from about 0.7% to about 1.2% $TiO_2$, from about 14.4% to about 15.6% $ZrO_2$, from about 29.2% to about 31.3% $P_2O_5$, and from about 0.1% to about 5.2% $Co_2O_3$.

In a further aspect, the invention provides a composition adapted for forming an enamel coating, the enamel composition prior to firing, comprising: (i) a glass component including: from about 7% to about 25%, preferably about 10 to about 20%, more preferably about 12% to about 19% of at least one $R_2O$; from about 0% to about 15%, preferably from about 3% to about 12%, more preferably from about 5% to about 11% of at least one RO; from about 5% to about 20%, preferably from about 8 to about 18%, more preferably from about 10% to about 17% of at least one $MO_2$; from about 8% to about 25%, preferably from about 10% to about 20%, more preferably from about 12% to about 19% of $Al_2O_3$; from about 3% to about 25%, preferably from about 5% to about 20%, more preferably from about 7% to about 18% of $SiO_2$; from about 15% to about 40%, preferably from about 20% to about 35%, more preferably 22% to about 32% of $P_2O_5$; and (ii) an effective amount of an additive; wherein $R_2O$ is an alkali oxide, RO is an alkaline earth oxide, and MO, $MO_2$ and $M_2O_3$ are transition metal oxides.

In still a further aspect, the invention provides a method of forming an enamel coating on a substrate, the method comprising: providing a substrate; providing a composition comprising (i) a glass component and (ii) an effective amount of an additive, wherein the glass component includes from about from about 7% to about 25%, preferably about 10 to about 20%, more preferably about 12% to about 19% of at least one $R_2O$; from about 0% to about 15%, preferably from about 3% to about 12%, more preferably from about 5% to about 11% of at least one RO; from about 5% to about 20%, preferably from about 8 to about 18%, more preferably from about 10% to about 17% of at least one $MO_2$; from about 8% to about 25%, preferably from about 10% to about 20%, more preferably from about 12% to about 19% of $Al_2O_3$; from about 3% to about 25%, preferably from about 5% to about 20%, more preferably from about 7% to about 18% of $SiO_2$; from about 15% to about 40%, preferably from about 20% to about 35%, more preferably 22% to about 32% of $P_2O_5$; and (ii) an effective amount of an additive; wherein $R_2O$ is an alkali oxide, RO is an alkaline earth oxide, and MO, $MO_2$ and $M_2O_3$ are transition metal oxides; depositing a layer of the composition on the substrate; and firing the layer to thereby form an enamel coating on the substrate.

In yet another aspect, the invention provides an enamel coated substrate, the enamel coating having a composition prior to firing that comprises: (i) a glass component and (ii) an effective amount of at least one additive, wherein the glass component includes from about 7% to about 25% of at least one $R_2O$; from about 0% to about 15% of at least one RO; from about 5% to about 20% of at least one $MO_2$; from about 8% to about 25% of $Al_2O_3$; from about 3% to about 25% of $SiO_2$; from about 15% to about 40% of $P_2O_5$; wherein $R_2O$ is an alkali oxide, RO is an alkaline earth oxide, and MO, $MO_2$ and $M_2O_3$ are transition metal oxides.

As will be realized, the invention is capable of other and different embodiments and its several details are capable of modifications in various respects, all without departing from the invention. Accordingly, the description is to be regarded as illustrative and not restrictive.

DETAILED DESCRIPTION OF THE EMBODIMENTS

The present invention provides compositions for use in forming an enamel cover coating from which baked-on foods can be removed without the need for pyrolysis or highly alkaline cleaners. The enamel cover coating produced using the compositions according to the invention exhibits no chipping or other surface defects after cleaning and removal of baked-on foods. Coated substrates according to the invention exhibit excellent food removal characteristics and do not require pyrolysis or use of caustic cleaners. The present invention also provides compositions for use in forming ground coatings or "ground coats" on substrates, and which coatings are well suited for receiving the enamel cover coats described herein.

Enamel Compositions

The enamel compositions of the present invention are preferably provided in the form of a dry powder. This promotes storage and enables the composition to be applied to substrates by well known powder coating processes. However, the compositions can also be provided and applied in a wet state such as a water-based slurry.

The enamel compositions of the invention include a glass component and an effective amount of one or more additives such as fluorine and/or $NO_2$. The glass component includes one or more oxides selected from the group consisting of $P_2O_5$, $Al_2O_3$, $ZrO_2$, $SiO_2$, $Na_2O$, $K_2O$, BaO, $TiO_2$, ZnO, $Co_2O_3$, NiO, $Cr_2O_3$, $MnO_2$, CuO, and combinations thereof. The compositions may also include one or more additional components such as but not limited to $Li_2O$, $Rb_2O$, $Cs_2O$, MgO, CaO, SrO, ZnO, $CeO_2$, $LaO_2$, $B_2O_3$, FeO, $Fe_2O_3$, and $Fe_3O_4$.

The glass component of the enamel compositions preferably comprises a combination of one or more alkali oxides represented as $R_2O$, one or more alkaline earth oxides represented as RO, and one or more various transition metal oxides represented herein as MO, $MO_2$, and $M_2O_3$.

The formula $R_2O$ represents alkali oxides, preferably selected from the group consisting of $Li_2O$, $Na_2O$, and $K_2O$. The formula RO represents alkaline earth oxides, preferably selected from the group consisting of MgO, CaO, SrO, and BaO.

The formulas MO, $MO_2$, and $M_2O_3$ represent transition metal oxides. MO includes ZnO, NiO, and CuO for example. $MO_2$ includes $TiO_2$ and $ZrO_2$ for example. And, $M_2O_3$ includes $Co_2O_3$ and $Cr_2O_3$ for example. It will be understood that M can be any transition metal as known in the art.

Preferably, the glass component of the enamel compositions comprises, prior to firing, from about 10.0% to about 20.0% and more preferably from about 14.1% to about 15.6% of one or more $R_2O$; from about 2.7% to about 3.3% of one or more RO; from about 0.6% to about 2.8% of one or more MO; from about 15.1% to about 17.6% of one or more $MO_2$; from about 0.1% to about 6.3% of one or more $M_2O_3$; from about 19.3% to about 20.7% of $Al_2O_3$; from about 10.8% to about 11.8% of $SiO_2$; and from about 29.2% to about 31.3% of $P_2O_5$.

Preferably and more specifically, the enamel compositions prior to firing, comprise (i) a glass component that includes from about 7.1% to about 7.9% $Na_2O$, from about 7.0% to about 7.7% $K_2O$, from about 0.6% to about 1.0% ZnO, from about 2.7% to about 3.3% BaO, from about 19.3% to about 20.7% $Al_2O_3$, from about 10.8% to about 11.8% $SiO_2$, from about 0.7% to about 1.2% $TiO_2$, from about 14.4% to about 15.6% $ZrO_2$, from about 29.2% to about 31.3% $P_2O_5$, and from about 0.1% to about 5.2% $Co_2O_3$, and (ii) an effective amount of at least one additive. The term "about" as used herein includes amounts or proportions of the noted component, agent, element or the like that are substantially the same as the noted amount. For example, the term "about" includes values that result when rounding (up or down) a noted weight percent to a value having a shorter decimal such as from a weight percent expressed in hundredths of a percent to the nearest tenth of a percent.

Typical, preferred and most preferred ranges for components in the glassy portion of the compositions are set forth below in Table 1 as follows (all values are in weight percent unless indicated otherwise).

TABLE 1

Glass Component Formulation Ranges

| Component | Most Preferred | Preferred | Typical |
|---|---|---|---|
| $Na_2O$ | 7.32-7.72 | 7.2-7.8 | 7.1-7.9 |
| $K_2O$ | 7.15-7.54 | 7.1-7.6 | 7.0-7.7 |
| ZnO | 0.77-0.83 | 0.7-0.9 | 0.6-1.0 |
| BaO | 2.92-3.12 | 2.8-3.2 | 2.7-3.3 |
| $Al_2O_3$ | 19.50-20.45 | 19.4-20.5 | 19.3-20.7 |
| $SiO_2$ | 11.00-11.63 | 10.9-11.7 | 10.8-11.8 |
| $TiO_2$ | 0.90-1.00 | 0.8-1.1 | 0.7-1.2 |
| $ZrO_2$ | 14.60-15.41 | 14.5-15.5 | 14.4-15.6 |
| $P_2O_5$ | 29.50-31.25 | 29.4-31.3 | 29.2-31.4 |
| NiO | 0-0.93 | 0-1.0 | 0-1.1 |
| CuO | 0-0.51 | 0-0.6 | 0-0.7 |
| $Co_2O_3$ | 0.34-4.90 | 0.2-5.0 | 0.1-5.2 |
| $MnO_2$ | 0-0.59 | 0-0.7 | 0-0.8 |
| $Cr_2O_3$ | 0-0.90 | 0-1.0 | 0-1.1 |

The present invention provides several preferred compositions set forth below in Table 2. These preferred compositions are designated as preferred compositions A, B, C, D, E, and F.

TABLE 2

Glass Component Preferred Compositions

| Component | Preferred Composition A | Preferred Composition B | Preferred Composition C |
|---|---|---|---|
| $Na_2O$ | 7.62 | 7.61 | 7.70 |
| $K_2O$ | 7.44 | 7.44 | 7.52 |
| ZnO | 0.81 | 0.79 | 0.80 |
| BaO | 3.06 | 3.06 | 3.10 |
| $Al_2O_3$ | 20.25 | 20.21 | 20.43 |
| $SiO_2$ | 11.50 | 11.49 | 11.61 |
| $TiO_2$ | 0.96 | 0.97 | 0.98 |
| $ZrO_2$ | 15.21 | 15.22 | 15.39 |
| $P_2O_5$ | 30.81 | 30.78 | 31.13 |
| NiO | 0.91 | — | — |
| CuO | 0.49 | — | — |
| $Co_2O_3$ | 0.36 | 1.55 | 0.46 |
| $M_nO_2$ | 0.57 | — | — |
| $Cr_2O_3$ | — | 0.88 | 0.44 |

| Component | Preferred Composition D | Preferred Composition E | Preferred Composition F |
|---|---|---|---|
| $Na_2O$ | 7.35 | 7.39 | 7.73 |
| $K_2O$ | 7.17 | 7.21 | 7.55 |
| ZnO | 0.78 | 0.78 | 0.80 |
| BaO | 2.95 | 2.97 | 3.11 |
| $Al_2O_3$ | 19.52 | 19.62 | 20.52 |
| $SiO_2$ | 11.09 | 11.15 | 11.66 |
| $TiO_2$ | 0.93 | 0.93 | 0.98 |
| $ZrO_2$ | 14.66 | 14.77 | 15.46 |
| $P_2O_5$ | 29.70 | 29.85 | 31.27 |
| NiO | 0.88 | 0.48 | — |
| CuO | 0.47 | — | — |
| $Co_2O_3$ | 0.35 | 4.85 | 0.89 |
| $M_nO_2$ | 0.55 | — | — |
| $Cr_2O_3$ | — | — | — |

In addition to the components set forth in Tables 1 and 2, it is also preferred to include an additive such as fluorine in an amount typically from about 0.78% to about 3.00%, preferably from about 0.88% to about 2.6%, and most preferably from about 0.91% to about 2.5% of the glass component. And, it is also preferred to include another additive such as $NO_2$ in an amount of typically from about 1.50% to about 4.71%, preferably from about 2.00% to about 4.61%, and most preferably from about 2.40% to about 4.56% of the glass component. These formulation ranges for the noted additives are set forth below in Table 3. Typically, after firing, about one-half of the fluorine remains in the resulting layer. Typically, all of the nitrogen dioxide is released or decomposed during firing.

TABLE 3

Additive Component Formulation Ranges

| Component | Most Preferred | Preferred | Typical |
|---|---|---|---|
| F | 0.91-2.5 | 0.88-2.6 | 0.78-3.0 |
| $NO_2$ | 2.40-4.56 | 2.00-4.61 | 1.50-4.71 |

In alternate embodiments of the invention, Preferred compositions G, H and J are provided.

TABLE 4

Formulation G.

| Component | Most Preferred Range G | Preferred Range G | Typical Range G |
|---|---|---|---|
| $Na_2O$ | 14.01-14.53 | 13.69-14.61 | 13.4-14.8 |
| $Al_2O_3$ | 12.95-13.45 | 12.72-13.59 | 12.6-13.8 |
| $SiO_2$ | 18.65-19.35 | 18.42-19.66 | 18.2-19.9 |
| $P_2O_5$ | 23.11-23.79 | 22.87-24.07 | 22.4-24.2 |
| SO3 | 0.01-0.25 | 0.01-0.50 | 0.01-0.8 |
| $K_2O$ | 6.27-6.93 | 6.02-7.15 | 5.7-7.4 |
| CaO | 0.48-0.91 | 0.37-1.03 | 0.2-1.20 |

TABLE 4-continued

Formulation G.

| Component | Most Preferred Range G | Preferred Range G | Typical Range G |
|---|---|---|---|
| $TiO_2$ | 3.58-4.01 | 3.37-4.23 | 3.2-4.5 |
| $Cr_2O_3$ | 0.64-0.98 | 0.55-1.09 | 0.4-1.3 |
| MnO | 0.05-0.39 | 0.01-0.54 | 0.01-0.70 |
| $Fe_2O_3$ | 1.48-1.94 | 1.25-2.12 | 1.1-2.3 |
| $Co_3O_4$ | 0.01-0.15 | 0.01-0.25 | 0.01-0.4 |
| NiO | 0.05-0.35 | 0.01-0.51 | 0.01-0.7 |
| CuO | 0.07-0.20 | 0.01-0.25 | 0.01-0.3 |
| SrO | 0.01-0.10 | 0.01-0.20 | 0.01-0.3 |
| $Y_2O_3$ | 0.03-0.15 | 0.01-0.21 | 0.01-0.4 |
| $ZrO_2$ | 11.10-11.59 | 9.87-11.82 | 9.5-12.0 |
| BaO | 2.01-2.59 | 1.87-2.77 | 1.6-2.9 |
| F | 1.27-1.76 | 1.14-1.85 | 0.8-2.0 |

TABLE 5

Formulation H.

| Component | Most Preferred Range H | Preferred Range H | Typical Range H |
|---|---|---|---|
| $Na_2O$ | 12.49-13.31 | 12.33-13.55 | 12.1-13.7 |
| MgO | 0.01-0.10 | 0.01-0.20 | 0.01-0.3 |
| $SiO_2$ | 57.43-58.29 | 57.17-58.37 | 56.8-58.7 |
| $P_2O_5$ | 0.05-0.20 | 0.01-0.25 | 0.01-0.4 |
| $K_2O$ | 4.44-4.93 | 4.29-5.11 | 4.1-5.2 |
| CaO | 2.61-2.99 | 2.37-3.20 | 2.1-3.4 |
| $TiO_2$ | 3.02-3.47 | 2.88-3.59 | 2.7-3.7 |
| $Cr_2O_3$ | 0.39-0.82 | 0.30-0.95 | 0.2-1.0 |
| MnO | 4.12-4.71 | 3.91-4.92 | 3.6-5.0 |
| $Fe_2O_3$ | 4.04-4.67 | 3.87-4.77 | 3.7-4.9 |
| $Co_3O_4$ | 1.14-1.63 | 0.95-1.75 | 0.8-1.9 |
| NiO | 0.05-0.15 | 0.02-0.27 | 0.01-0.4 |
| CuO | 1.44-1.95 | 1.25-2.08 | 1.1-2.3 |
| SrO | 0.01-0.10 | 0.01-0.20 | 0.01-0.3 |
| $ZrO_2$ | 0.49-0.88 | 0.37-0.97 | 0.2-1.1 |
| $MoO_3$ | 0.23-0.77 | 0.15-0.87 | 0.1-1.0 |
| $Sb_2O_3$ | 0.62-0.97 | 0.55-1.16 | 0.4-1.4 |
| BaO | 1.98-2.37 | 1.62-2.55 | 1.5-2.7 |
| F | 0.95-1.29 | 0.82-1.44 | 0.6-1.7 |

TABLE 6

Formulation J.

| Component | Most Preferred Range J | Preferred Range J | Typical Range J |
|---|---|---|---|
| $Na_2O$ | 12.24-12.89 | 11.94-13.14 | 11.73-13.31 |
| MgO | 0.02-0.15 | 0.01-0.20 | 0.01-0.32 |
| $Al_2O_3$ | 17.29-17.91 | 16.75-18.12 | 16.47-18.39 |
| $SiO_2$ | 18.57-19.37 | 18.12-19.66 | 17.77-20.04 |
| $P_2O_5$ | 20.58-21.22 | 20.45-21.39 | 20.32-21.48 |
| SO3 | 0.01-0.15 | 0.01-0.27 | 0.01-0.40 |
| $K_2O$ | 5.26-5.69 | 4.92-5.81 | 4.70-6.08 |
| CaO | 0.48-0.91 | 0.35-0.98 | 0.27-1.05 |
| $TiO_2$ | 4.21-4.63 | 3.97-4.89 | 3.51-5.14 |
| $Cr_2O_3$ | 2.42-2.79 | 2.29-2.97 | 2.05-3.22 |
| MnO | 0.21-0.51 | 0.10-0.75 | 0.01-0.98 |
| $Fe_2O_3$ | 0.82-1.41 | 0.69-1.58 | 0.55-1.75 |
| $Co_3O_4$ | 0.01-0.15 | 0.01-0.27 | 0.01-0.41 |
| NiO | 0.05-0.27 | 0.01-0.35 | 0.01-0.48 |
| CuO | 1.37-1.88 | 1.25-2.02 | 1.11-2.35 |
| SrO | 0.01-0.11 | 0.01-0.22 | 0.01-0.31 |
| $Y_2O_3$ | 0.01-0.15 | 0.01-0.21 | 0.01-0.32 |
| $ZrO_2$ | 9.15-9.58 | 8.85-9.72 | 8.61-10.00 |
| BaO | 1.51-1.99 | 1.40-2.27 | 1.32-2.46 |
| F | 1.11-1.64 | 0.85-1.62 | 0.75-1.88 |

TABLE 7

Formulation K.

| Component | Most Preferred Range K | Preferred Range K | Typical Range K |
|---|---|---|---|
| $P_2O_5$ | 27.57-27.98 | 27.39-28.18 | 27.2-28.4 |
| $Al_2O_3$ | 20.97-21.39 | 20.75-21.59 | 20.6-21.8 |
| $R_2O$ | 15.08-15.61 | 14.91-15.78 | 14.8-16.0 |
| $B_2O_3$ | 0.21-0.73 | 0.12-0.91 | 0.01-1.00 |
| RO + ZnO | 3.47-4.01 | 3.21-4.32 | 3.0-4.6 |
| $TiO_2 + ZrO_2$ | 15.44-15.92 | 15.17-16.21 | 15.0-16.5 |
| $SiO_2$ | 12.19-12.91 | 11.92-13.14 | 11.7-13.4 |

TABLE 8

Formulation L.

| Component | Most Preferred Range L | Preferred Range L | Typical Range L |
|---|---|---|---|
| $P_2O_5$ | 26.87-27.42 | 26.69-27.71 | 26.4-28.1 |
| $Al_2O_3$ | 20.27-20.89 | 20.02-21.12 | 19.8-21.4 |
| $R_2O$ | 17.79-18.38 | 17.42-18.51 | 17.0-18.8 |
| $B_2O_3$ | 1.89-2.38 | 1.61-2.77 | 1.4-2.9 |
| RO + ZnO | 3.17-3.84 | 3.01-4.12 | 2.8-4.3 |
| $TiO_2 + ZrO_2$ | 13.02-13.65 | 12.77-13.84 | 12.5-14.0 |
| $SiO_2$ | 11.38-11.89 | 11.15-12.29 | 10.9-12.6 |

TABLE 9

Formulation M.

| Component | Most Preferred Range M | Preferred Range M | Typical Range M |
|---|---|---|---|
| $P_2O_5$ | 19.77-20.42 | 19.51-20.68 | 19.3-20.9 |
| $Al_2O_3$ | 14.92-15.69 | 14.71-15.93 | 14.2-16.2 |
| $R_2O$ | 18.37-19.21 | 18.22-19.55 | 17.9-19.8 |
| $B_2O_3$ | 5.47-6.18 | 5.28-6.47 | 5.1-6.8 |
| RO + ZnO | 3.07-3.34 | 2.88-3.68 | 2.6-3.8 |
| $TiO_2 + ZrO_2$ | 11.74-12.33 | 11.52-12.81 | 11.2-13.1 |
| $SiO_2$ | 19.50-20.12 | 11.15-12.29 | 10.9-12.6 |

The glass frits comprising the glass component of the compositions according to the invention are preferably milled prior to application. Any of the conventional milling techniques can be employed. Milling fineness is not critical, but a fineness of about 2 grams being retained from a 50 gram sample using a 200 mesh sieve is presently considered optimal. Other particle size distributions may also be utilized. After milling, it may be desired to subject the milled composition to a post heat treatment such as exposure to temperatures of about 200° F. (93° C.) for about 18 hours. More broadly, the heat treatment may be undertaken after firing, and may be carried out at 70° F. to 500° F. (25° C. to 260° C.) for 1 to 50 hours, preferably 2 to 25 hours.

It will be appreciated that the compositions according to the invention can further comprise up to about 20% by weight of one or more mill additions. Suitable mill additions include, for example, clay, bentonite, magnesium carbonate, potassium nitrate, sodium aluminate, boric acid, and pigments. Inorganic materials, such as zirconia, alumina, alumina metaphosphate, spodumene, and feldspar, can also be added to the composition in order to modify the texture and/or to adjust the roughness of the fired enamel.

The compositions according to the invention are intended for use as a cover coating. The compositions can be applied like any of the known cover coat enamels for use on sheet steel. For example, the compositions can be applied directly onto pickled, nickel-coated steel. The compositions can be applied onto aluminum substrates. The compositions can be applied over fired enamel ground coated substrates using known two-coat/two-fire processes. And, the compositions can be applied over unfired ground coats using any of the known two-coat/one-fire processes (e.g., wet/wet, wet/dry, and dry/dry).

Ground Coat Compositions

The present invention also provides various ground coat compositions. These ground coat compositions generally comprise a glassy component and an additive component. These ground coat compositions have been discovered to be particularly well suited for use with the enamel compositions described herein. Moreover, it is also contemplated that the various ground coat compositions can be used in conjunction with one or more other top coat or cover coat formulations.

The glass component of the ground coat compositions preferably comprises a combination of one or more alkali oxides represented as $R_2O$, one or more alkaline earth oxides represented as RO, and one or more various transition metal oxides represented herein as MO, $MO_2$, and $M_2O_3$.

The formula $R_2O$ represents alkali oxides, preferably selected from the group consisting of $Li_2O$, $Na_2O$, and $K_2O$. The formula RO represents alkaline earth oxides, preferably selected from the group consisting of MgO, CaO, SrO, and BaO.

The formulas MO, $MO_2$, and $M_2O_3$ represent transition metal oxides. MO includes NiO, CuO, and $Fe_2O_3$ for example. $MO_2$ includes $TiO_2$, $ZrO_2$, and $MnO_2$ for example. And, $M_2O_3$ includes $Co_2O_3$ for example. It will be appreciated that M can be any transition metal as known in the art.

Preferably, the glass component of the ground coat compositions comprises, prior to firing, from about 14.4% to about 18.4% of one or more $R_2O$; from about 8.5% to about 11.7% of one or more RO; from about 2.5% to about 5.3% of one or more MO; from about 4.0% to about 9.2% of one or more $MO_2$; from about 0.4% to about 1.4% of one or more $M_2O_3$; from about 16.0% to about 17.2% of $B_2O_2$; from about 2.0% to about 5.0% of $Al_2O_3$; and from about 41.8% to about 46.2% of $SiO_2$.

Table 4 set forth below lists various preferred ground coat formulations along with corresponding typical, preferred, and most preferred concentration ranges for their constituents. Table 5 presents several preferred ground coat compositions, designated herein as compositions V, W, X, Y, and Z.

In addition to the components set forth in Tables 4 and 5, it is also preferred to include an additive such as fluorine in an amount of from about 6.7% to about 9.0%, preferably from about 6.9% to about 8.8%, and most preferably from about 7.1% to about 8.6%. And, it is preferred to use another additive such as $NO_2$ in an amount typically from about 2.3% to about 3.3%, preferably from about 2.5% to about 3.1%, and most preferably from about 2.7% to about 2.9%. These formulation ranges are noted in Table 12.

TABLE 10

Ground Coat Formulation Ranges

| Component | Most Preferred | Preferred | Typical |
|---|---|---|---|
| $Li_2O$ | 2.9-3.2 | 2.7-3.4 | 2.5-3.6 |
| $Na_2O$ | 11.4-12.3 | 11.2-12.5 | 11.0-12.7 |
| $K_2O$ | 1.3-1.7 | 1.1-1.9 | 0.9-2.1 |
| CaO | 5.8-6.4 | 5.6-6.6 | 5.4-6.8 |
| BaO | 3.5-4.5 | 3.3-4.7 | 3.1-4.9 |

TABLE 10-continued

Ground Coat Formulation Ranges

| Component | Most Preferred | Preferred | Typical |
|---|---|---|---|
| $B_2O_3$ | 16.4-16.8 | 16.2-17.0 | 16.0-17.2 |
| $Al_2O_3$ | 2.4-4.6 | 2.2-4.8 | 2.0-5.0 |
| $SiO_2$ | 42.4-45.6 | 42.0-46.0 | 41.8-46.2 |
| $TiO_2$ | 0-1.2 | 0-1.4 | 0-1.6 |
| $ZrO_2$ | 3.4-5.9 | 3.2-6.1 | 3.0-6.3 |
| NiO | 2.6-2.8 | 2.4-3.0 | 2.2-3.2 |
| CuO | 0.7-0.8 | 0.5-1.0 | 0.3-1.2 |
| $Fe_2O_3$ | 0.2-0.5 | 0.1-0.7 | 0.05-0.9 |
| $Co_2O_3$ | 0.8-1.0 | 0.6-1.2 | 0.4-1.4 |
| $MnO_2$ | 1.4-1.9 | 1.2-1.1 | 1.0-1.3 |

TABLE 11

Ground Coat Preferred Compositions

| Component | Preferred Composition V | Preferred Composition W | Preferred Composition X | Preferred Composition Y | Preferred Composition Z |
|---|---|---|---|---|---|
| $Li_2O$ | 3.14 | 3.14 | 3.14 | 3.14 | 2.93 |
| $Na_2O$ | 11.43 | 11.43 | 11.43 | 11.43 | 12.23 |
| $K_2O$ | 1.64 | 1.64 | 1.64 | 1.64 | 1.31 |
| CaO | 6.40 | 6.40 | 6.40 | 6.40 | 5.83 |
| BaO | 4.48 | 4.48 | 4.48 | 4.48 | 3.59 |
| $B_2O_3$ | 16.45 | 16.45 | 16.45 | 16.45 | 16.72 |
| $Al_2O_3$ | 3.10 | 4.50 | 3.10 | 3.10 | 2.48 |
| $SiO_2$ | 42.44 | 42.44 | 42.44 | 45.50 | 44.49 |
| $TiO_2$ | 0.00 | 0.00 | 0.00 | 0.00 | 1.17 |
| $ZrO_2$ | 4.35 | 4.35 | 5.80 | 4.35 | 3.48 |
| NiO | 2.72 | 2.72 | 2.72 | 2.72 | 2.70 |
| CuO | 0.74 | 0.74 | 0.74 | 0.74 | 0.72 |
| $Fe_2O_3$ | 0.29 | 0.29 | 0.29 | 0.29 | 0.47 |
| $Co_2O_3$ | 0.96 | 0.96 | 0.96 | 0.96 | 0.81 |
| $MnO_2$ | 1.84 | 1.84 | 1.84 | 1.84 | 1.47 |

TABLE 12

Additive Component Formulation Ranges

| Component | Most Preferred | Preferred | Typical |
|---|---|---|---|
| $NO_2$ | 2.7-2.9 | 2.5-3.1 | 2.3-3.3 |
| F | 7.1-8.6 | 6.9-8.8 | 6.7-9.0 |

Methods

The enamel compositions according to the present invention can be applied by any of the known wet application processes such as spraying, dipping, flow coating, and electrodeposition. Preferably, the compositions are dried prior to firing when the compositions are applied using a wet application process. Drying is typically accomplished using heating lamps. The drying time and temperature are not critical. The application rate of the compositions by wet application processes will vary depending upon the desired thickness of the resulting fired enamel cover coat. For example, a fired enamel cover coat having a thickness of about 140 Φm can be obtained when the application rate of the wet enamel composition is about 400 g/m².

The enamel compositions can also be applied using conventional dry electrostatic application processes. In such instances, an organopolysiloxane is typically added to the compositions to facilitate electrostatic application. The application rate of the compositions by dry electrostatic processes will vary widely according to the desired thickness of the resultant enamel cover coat. Typical application rates are from about 200 g/m² to about 600 g/m². In other terms, the organopolysiloxane may be added to the pre-fired enamel composition of the invention in an amount of 0.01-1 wt %, preferably 0.02-0.5 wt %, more preferably 0.03-0.4 wt % and still more preferably 0.05-0.25 wt %.

The enamel compositions according to the present invention are typically fired at a temperature of from about 1420 to about 1600° F. (770° C. to about 870° C.) for about 2 to about 8 minutes. More preferably, the compositions are fired at a temperature of from about 800° C. to about 850° C. for about 3 to about 6 minutes. The optimal firing conditions are 820° C. for about 3.5 minutes. It will be appreciated that firing times and temperatures are not critical, and a range of firing schedules could be used.

Upon firing, the enamel compositions according to the present invention form an enamel cover coat from which baked-on foods can be removed without the need for pyrolysis or highly alkaline cleaners. The enamel compositions according to the invention are particularly well-suited for application on the interior surfaces of oven cavities, dripping pans, cookware, and other articles that are exposed to the risk of baked-on food soiling. The compositions are also expected to find wide application in microwave ovens. The fired enamel cover coat can be produced in a wide range of colors, including bright colors such as blue and green, by varying the pigments included as mill additions.

Mill added oxide (i.e., pigments) can also be added, for example, a cobalt chrome spinel black. This also reduces the L color value of the fired color. However, excessive added oxide results in spray problems with the enamels of the invention, which are dry applied electrostatically.

Pigments may be included in the pre-fired composition of the invention in an amount of 0.01-2 wt %, preferably 0.1-1.5 wt %, more preferably 0.25-1.25 wt %, still more preferably 0.5-1 wt % and most preferably about 1 wt %.

The fired cover coat enamels according to the invention are scratch resistant, stain resistant, and maintain their easy-to-clean properties over many heating cycles. In addition, baked-on food can be easily removed from the fired cover coat enamels without the need for high temperature heating cycles or highly alkaline chemical cleaners. Most baked-on foods can be removed from the fired enamel cover coats using warm water. In a particularly preferred cleaning technique, surfaces in accordance with the invention having baked-on food residue are exposed to warm water vapor, such as having a temperature of at least 150° F. (66° C.), and most preferably steam having a temperature of about 212° F. (100° C.) for at least about 3 minutes, more preferably at least about 5 minutes, and more preferably at least about 10 minutes. Such surfaces can also be exposed to liquid water which is preferably warm and more preferably at the noted temperatures for the noted time periods. After such exposure, the food or food residue can be easily cleaned off the surface. As noted, the cleaning efforts do not require the use of harsh or caustic cleaning agents or exposure to much greater temperatures such as associated with pyrolysis.

The ground coat compositions according to the present invention can be applied by any of the known wet application processes such as spraying, dipping, flow coating, and electrodeposition. Preferably, the compositions are dried prior to firing when the compositions are applied using a wet application process. Drying is typically accomplished using forced convection or forced air. The drying time and temperature are not critical. The application rate of the compositions by wet application processes will vary depending upon the desired thickness of the resulting fired enamel cover coat.

The ground coat compositions can also be applied using conventional dry electrostatic application processes. In such instances, one or more agents are typically added to the compositions to facilitate electrostatic application. The application rate of the compositions by dry electrostatic processes will vary widely according to the desired thickness of the resultant ground coat.

The ground coat compositions according to the present invention are typically fired according to practices known in the art. It will be appreciated that firing times and temperatures are not critical, and a range of firing schedules could be used.

In accordance with the invention, multilayer coated substrates are provided. In a preferred embodiment, a substrate receives a ground coat as described herein and then also receives an enamel cover coat as described herein. The ground coat is preferably disposed between and in contact with the substrate and the enamel cover coat. However, it will be appreciated that the invention includes a wide array of other configurations.

When utilized in conjunction with one another, the ground coat and the enamel cover coat can be applied, dried, and fired in a variety of different strategies. For example, a ground coat and an enamel cover coat can be applied via a two-coat/two-fire dry process in which a dry ground coat is applied and then fired, followed by application of a dry enamel cover coat to the fired ground coat. The enamel cover coat is then fired. A two-coat/one-fire dry process can be used in which a dry ground coat is applied and then a dry enamel cover coat is applied onto the unfired ground coat. The two layers are then collectively fired. Another method involves a two-coat/two-fire wet/wet process in which a wet ground coat is applied, dried, and then fired. A wet enamel cover coat is then applied onto the fired ground coat, dried, and then fired. Yet another process is referred to as a two-coat/one-fire wet/dry process involving application of a wet ground coat, drying and then application of a dry enamel cover coat on the dried ground coat. The resulting layers are then collectively fired. In still another technique, referred to as a two-coat/one-fire wet/wet process, a wet ground coat is applied followed by application of a wet enamel coat onto the undried ground coat. A single firing is performed.

EXAMPLES

Example 1

Two-Coat/Two-Fire Application

Glass frit according to the preferred composition C from Table 2 was milled into an electrostatic powder composition as shown in Table 7. This powder is designated as "Powder Enamel 1."

TABLE 7

| Powder Enamel 1 Powder Formulation | |
|---|---|
| Raw Material | Powder Enamel 1 |
| Frit C | 99.5 |
| Spinel Black Oxide | 1.0 |
| Siloxane | 0.18 |
| Fineness | 1-2%/200 M Sieve |
| Screening | 100 mesh |
| Post Milling Heat Treatment | 200° F. (93° C.) for 18 hours |

Powder Enamel 1 was applied to a steel substrate as follows. First, 33 to 40 g/ft² (355 to 430 g/m²) of electrostatic ground coat was applied over cleaned-only ASTM A424-compliant enameling grade steel. Electrostatic ground coats suitable for pyrolytic self-cleaning ovens are preferred, but any ground coat that creates adhesion on steel could be used. If a pyrolytic self-cleaning ground coat is used, such coating is fired at about 1560° F. (850° C.) for 90 seconds at peak metal temperature. The ground coat was allowed to cool, and Powder Enamel 1 was applied at a coating density of about 34 to 40 g/ft² (366 to 430 g/m²) and fired at about 1560° F. (850° C.) for 90 seconds at peak metal temperature.

Test plates were prepared by a two-coat/two-fire dry electrostatic process. About 34 to 40 g/ft² (366 to 430 g/m²) of flecked blue pyrolytic ground coat were applied electrostatically to 5.5 inch by 5.5 inch (14 cm by 14 cm) cleaned Type 1 enameling steel plates. The ground coat was fired at 1560° F. (850° C.) for 4.0 minutes in the hot zone in an electric continuous furnace. Powder Enamel 1 was applied at a coating density of 33 to 47 g/ft² (355 to 506 g/m²) and fired at 1560° F. (850° C.) for 4.0 minutes. Powder Enamel 1 fired out into a smooth glossy gray finish free from defects. The Lab color measured on a Datacolor International Spectraflash SF450 color machine was L=25.7, a=−0.8, and b=−2.5. The dark gray color can be measured in other color spaces as well. The CIELab color was L*=37.8, a*=0.8, and b*=−2.6.

It will be noted that although flecked blue pyrolytic ground coats were prepared, in many applications it may be preferred to prepare and/or provide a flecked gray pyrolytic ground coat.

Cleanability was tested against a reference standard self-cleaning pyrolytic standard, preferably the ground coat used for the water-clean enamel.

Six foodstuffs to be tested were prepared as follows:
1. AHAM mixture
2. Cherry pie filling
3. Lemon juice
4. Beef gravy
5. Ketchup
6. Egg whites (or egg beaters)

The recipe for AHAM is shown in Table 8.

TABLE 8

AHAM Mixture Recipe

| AHAM Mixture | U.S. | Metric |
|---|---|---|
| 75% Lean ground beef | 4 oz. | 113 g |
| Grated cheddar cheese | ½ cup | 119 mL |
| Whole milk | ½ cup | 119 mL |
| Granulated white sugar | ½ cup | 119 mL |
| Canned sour pie cherries | ½ cup | 119 mL |
| Dry, uncooked instant tapioca pudding mix | 2 tbsp. | 30 mL |
| Large raw egg | 1 | 1 |
| All-purpose flour | 2 tbsp. | 30 mL |
| Tomato juice | ½ cup | 119 mL |

First, the panels were placed in a conventional free-standing electric range that was then preheated to 450° F. (232° C.). Second, the oven was turned off, and 0.5 teaspoon (2.5 ml) of each of the noted foodstuffs was applied to the panels. Next, the soils were baked-on at 450° F. (232° C.) for 1 hour.

The oven was allowed to cool for 15 minutes. A traditional pyrolytic enamel was soiled as a reference sample. To rate the cleanability of the coatings, the soiled panels were placed in an enameled broiler pan. To the broiler pan was added 3 to 4 cups (700 to 1000 ml) of water. The broiler pan with water and the soiled panels were then heated in the oven at 250° F. (121° C.) for 30 minutes and allowed to cool for 30 minutes.

Using a Scotch-Brite scouring sponge, it was first attempted to remove all the soils with a light rub. After evaluating and recording, the attempt was changed to a hard rub to finalize scoring. Each soil received a score according to the rating system shown in Table 9 set forth below.

TABLE 9

Rating System Per Soil

| Force and Residue | Score |
|---|---|
| Light Rub Full Cleaning | 5 |
| Light Rub Some Residue | 4 |
| Hard Rub Full Cleaning | 3 |
| Hard Rub Some Residue | 2 |
| Ingredients Can't Be Removed | 1 |

The score for each soil was summed and the totals were assigned ratings according to the criteria in Table 10.

TABLE 10

Cleanability Ratings

| Cleanability Score | Class |
|---|---|
| 25-30 | A |
| 20-24 | B |
| 15-19 | C |
| 10-14 | D |
| 0-9 | E |

Using this testing method, Powder Enamel 1 exhibited the cleanability characteristics shown in Table 11.

TABLE 11

Cleanability of Powder Enamel 1
Applied With a Two-Coat/Two-Fire Process

| Soil | Pyrolytic | Powder Enamel 1 |
|---|---|---|
| AHAM | 0 | 5 |
| Cherry Pie Filling | 0 | 4 |
| Lemon Juice | 5 | 5 |
| Beef Gravy | 1 | 5 |
| Ketchup | 1 | 4 |
| Egg Whites or Egg Beaters | 1 | 5 |
| Total Score | 8 | 28 |
| Rating | E | A |

As evident from the data in Table 11, a coating prepared from a two-coat/two-fire application of Powder Enamel 1 exhibited significantly better cleanability characteristics as compared to a standard self-cleaning pyrolytic coating.

Example 2

Two-Coat/One-Fire Application

Test plates were prepared by a two-coat/one-fire dry electrostatic process. A base coat was applied at a coating density of about 5 to about 7 g/ft² (54 to 75 g/m²) followed by an application of Powder Enamel 1 at a coating density of 33 to 47 g/ft² (355 to 506 g/m²). Test plates were fired at 1560° F. (850° C.) for 4.0 minutes.

The cleanability was tested using the procedure described in Example 1. The results are shown in Table 12.

TABLE 12

Cleanability of Powder Enamel 1
Applied With a Two-Coat/One-Fire Process

| Soil | Pyrolytic | Powder Enamel 1 |
|---|---|---|
| AHAM | 0 | 5 |
| Cherry Pie Filling | 0 | 4 |
| Lemon Juice | 5 | 5 |
| Beef Gravy | 1 | 5 |
| Ketchup | 1 | 4 |
| Egg Whites or Egg Beaters | 1 | 5 |
| Total Score | 8 | 28 |
| Rating | E | A |

As evident from Table 12, a coating prepared from a two-coat/one-fire application of Powder Enamel 1 exhibited significantly better cleanability characteristics as compared to the noted self-cleaning pyrolytic coating.

Example 3

Color

This is an example of a frit formulation for forming a blue version of the coating. Glass frit according to preferred composition E from Table 2 was milled into electrostatic powder composition using the formula shown in Table 13. This powder is designated as "Powder Enamel 2."

TABLE 13

Powder Enamel 2 Powder Formulation

| Raw Material | Powder Enamel 2 |
|---|---|
| Frit E | 99.5 |
| Cobalt Aluminate Blue Oxide | 0.25 |
| Siloxane | 0.18 |
| Fineness | 1-2%/200 M Sieve |
| Screening | 100 mesh |
| Post Milling Heat Treatment | 200° F. (93° C.) for 18 hours |

Test plates were prepared by a two-coat/two-fire dry electrostatic process. About 34 to 40 g/ft$^2$ (366 to 430 g/m$^2$) of flecked blue pyrolytic ground coat were applied electrostatically to 5.5 inch by 5.5 inch (14 cm by 14 cm) cleaned Type 1 enameling steel plates. The ground coat was fired at 1560° F. (850° C.) for 4.0 minutes in the hot zone in an electric continuous furnace. Powder Enamel 2 was applied at a coating density of 33 to 47 g/ft$^2$ (355 to 506 g/m$^2$) and fired at 1560° F. (850° C.) for 4.0 minutes. Powder Enamel 2 fired out into a smooth glossy gray finish free from defects.

The cleanability was tested using the procedure described in Example 1. The results are shown in Table 14.

TABLE 14

Cleanability of Powder Enamel 2
Applied With a Two-Coat/Two-Fire Process

| Soil | Pyrolytic | Powder Enamel 2 |
|---|---|---|
| AHAM | 0 | 5 |
| Cherry Pie Filling | 0 | 4 |
| Lemon Juice | 5 | 5 |
| Beef Gravy | 1 | 5 |
| Ketchup | 1 | 4 |
| Egg Whites or Egg Beaters | 1 | 5 |
| Total Score | 8 | 28 |
| Rating | E | A |

As evident from the data in Table 14, a coating prepared from a two-coat/two-fire application of Powder Enamel 2 exhibited significantly better cleanability characteristics as compared to a standard self-cleaning pyrolytic coating.

Example 4

Two-Coat/Two-Fire, Wet/Wet

Preferred glass composition C from Table 2 can also be ground with conventional additives known to the industry for wet spray, dip, or flow coat application. Frit C was milled into a slurry according to the formula shown in Table 15 (values in parts by weight). This slurry is designated as Enamel 3. This is a recipe typically used for flow coating or dipping enamels, and other combinations of enamel raw materials could also be used.

TABLE 15

Slurry Formulation

| Raw Material | Slurry Enamel 3 |
|---|---|
| Frit C | 100 |
| Spinel Black Oxide | 1 |
| Ball Clay | 4 |
| Aluminum Oxide | 4 |
| Aluminum Phosphate | 2 |
| Bentonite | 0.45 |
| Magnesium Carbonate | 0.4 |
| Potassium Carbonate | 0.35 |
| Sodium Aluminate | 0.031 |
| Potassium Nitrite | 0.15 |
| Gum Arabic | 0.01 |
| Seqlene | 0.018 |
| Water | 47 |

The slurry was applied at a coating density of 33 to 47 g/ft$^2$ (355 to 506 g/m$^2$) to a previously wet-applied and fired ground coated steel and fired at 1560° F. (850° C.) for 4.0 minutes. The enamel slurry fired out into a smooth glossy gray finish free from defects.

The cleanability of the resulting enamel coating was tested using the procedure described in Example 1. Results are shown in Table 16.

TABLE 16

Cleanability of Enamel 3
Applied Wet With a Two-Coat/Two-Fire Process

| Soil | Pyrolytic | Enamel 3 |
|---|---|---|
| AHAM | 0 | 5 |
| Cherry Pie Filling | 0 | 3 |
| Lemon Juice | 5 | 5 |
| Beef Gravy | 1 | 4 |
| Ketchup | 1 | 3 |
| Egg Whites or Egg Beaters | 1 | 5 |

TABLE 16-continued

Cleanability of Enamel 3
Applied Wet With a Two-Coat/Two-Fire Process

| Soil | Pyrolytic | Enamel 3 |
|---|---|---|
| Total Score | 8 | 25 |
| Rating | E | A |

As evident from the data in Table 16, a coating prepared from a wet version of Enamel 3 exhibited significantly better cleanability characteristics as compared to a standard self-cleaning pyrolytic coating.

Example 5

Two-Coat/One-Fire, Wet/Dry

A coated substrate could be formed by appropriately applying a wet ground coat composition as described herein. The ground coat would then be subjected to a drying operation. After sufficient drying, a dry enamel composition is then applied onto the dried and un-fired ground coat. The dry enamel composition can be applied in a variety of different fashions, including for example by powder coat techniques. After application of the enamel composition, the multilayer laminate is then subjected to a firing operation to collectively fire the ground coat and the enamel coat.

Example 6

Two-Coat/One-Fire, Wet/Wet

Using this method, a coated substrate could be formed by appropriately applying a wet ground coat composition onto a substrate. Prior to drying of the ground coat, a wet enamel composition is applied thereon. The resulting layered assembly is then subjected to firing conditions whereby the ground coat and the enamel coat are both collectively fired.

Many other benefits will no doubt become apparent from future application and development of this technology.

All patents, published applications, and articles noted herein are hereby incorporated by reference in their entirety.

It will be understood that any one or more feature or component of one embodiment described herein can be combined with one or more other features or components of another embodiment. Thus, the present invention includes any and all combinations of components or features of the embodiments described herein.

As described hereinabove, the present invention solves many problems associated with previous type compositions, methods, and coatings. However, it will be appreciated that various changes in the details, materials and arrangements, which have been herein described and illustrated in order to explain the nature of the invention, may be made by those skilled in the art without departing from the principle and scope of the invention, as expressed in the appended claims.

What is claimed is:

1. A composition adapted for forming an enamel coating, the composition, comprising prior to firing:
   (i) a glass component including:
      from about 7.1% to about 7.9% $Na_2O$,
      from about 7.0% to about 7.7% $K_2O$,
      from about 0.6% to about 1.0% ZnO,
      from about 2.7% to about 3.3% BaO,
      from about 19.3% to about 20.7% $Al_2O_3$,
      from about 10.8% to about 11.8% $SiO_2$,
      from about 0.7% to about 1.2% $TiO_2$,
      from about 14.4% to about 15.6% $ZrO_2$,
      from about 29.2% to about 31.3% $P_2O_5$,
      and from about 0.1% to about 5.2% $Co_2O_3$ and
   (ii) at least one additive selected from the group consisting of fluorine and $NO_2$, and all percentages are by weight.

2. The composition of claim 1, wherein the at least one additive is present, and prior to firing, is selected from the group consisting of 0.78-3 wt % fluorine and 1.5-4.71 wt % $NO_2$.

3. The composition of claim 2 wherein the enamel composition further includes:
   from about 0% to about 0.25% Ni,
   at least 0.75% pigment, and
   at least 0.05% of at least one siloxane.

4. The composition of claim 1, wherein the enamel composition includes less than 0.20% Ni.

5. The composition of claim 1, wherein the enamel is devoid of nickel.

6. A composition having a Hunter L color value of less than 30 obtained by firing the composition of claim 1.

7. An enamel coated substrate, the enamel coating having a composition prior to firing that comprises: (i) a glass component and (ii) an effective amount of at least one additive, selected from the group consisting of 0.78-3 wt % fluorine and 1.50-4.71 wt % $NO_2$, wherein the glass component includes from about from about 7.1% to about 7.9% $Na_2O$, from about 7.0% to about 7.7% $K_2O$, from about 0.6% to about 1.0% ZnO, from about 2.7% to about 3.3% BaO, from about 19.3% to about 20.7% $Al_2O_3$, from about 10.8% to about 11.8% $SiO_2$, from about 0.7% to about 1.2% $TiO_2$, from about 14.4% to about 15.6% $ZrO_2$, from about 29.2% to about 31.3% $P_2O_5$, and from about 0.1% to about 5.2% $Co_2O_3$, and all percentages are by weight.

8. The enamel coated substrate of claim 7, wherein the at least one additive is selected from the group consisting of 0.88-2.6% fluorine and 2.0-4.61% $NO_2$.

9. The enamel coated substrate of claim 7 wherein the substrate is selected from the group consisting of steel and aluminum.

10. The enamel coated substrate of claim 7 wherein the composition is disposed on a ground coat.

11. The enamel coated substrate of claim 10 wherein the ground coat is disposed on a substrate selected from the group consisting of steel and aluminum.

12. A composition adapted for forming an enamel coating, the composition, comprising prior to firing:
   from about 2.5% to about 3.6% $Li_2O$,
   from about 11.0% to about 12.7% $Na_2O$,
   from about 0.9% to about 2.1% $K_2O$,
   from about 5.4% to about 6.8% CaO,
   from about 3.1% to about 4.9% BaO,
   from about 16.0% to about 17.2% $B_2O_3$,
   from about 2.0% to about 5.0% $Al_2O_3$,
   from about 41.8% to about 46.2% $SiO_2$,
   from about 0% to about 1.6% $TiO_2$,
   from about 3.0% to about 6.3% $ZrO_2$,
   from about 2.2% to about 3.2% NiO,
   from about 0.3% to about 1.2% CuO,
   from about 0.05% to about 0.9% $Fe_2O_3$,
   from about 0.4% to about 1.4% $Co_2O_3$, and
   from about 1.0% to about 1.3% $MnO_2$,
   all percentages by weight.

13. The composition of claim 12, wherein $TiO_2$ is present in an amount of from about 0.7% to about 1.2%.

* * * * *